US012054989B1

(12) United States Patent
Bielfelt et al.

(10) Patent No.: US 12,054,989 B1
(45) Date of Patent: Aug. 6, 2024

(54) DOCK SWIMMING LADDER

(71) Applicant: Timpte Industries, Inc., Denver, CO (US)

(72) Inventors: Terry J. Bielfelt, Omaha, NE (US); Martin E. Ourada, Lincoln, NE (US); Ryan H. Bakersfield, Lincoln, NE (US)

(73) Assignee: Timpte Industries, Inc., Denver, CO (US)

( * ) Notice: Subject to any disclaimer, the term of this patent is extended or adjusted under 35 U.S.C. 154(b) by 439 days.

(21) Appl. No.: 17/317,477

(22) Filed: May 11, 2021

Related U.S. Application Data

(60) Provisional application No. 63/109,376, filed on Nov. 4, 2020, provisional application No. 63/022,969, filed on May 11, 2020.

(51) Int. Cl.
*E06C 9/08* (2006.01)
*E06C 7/50* (2006.01)

(52) U.S. Cl.
CPC . *E06C 9/08* (2013.01); *E06C 7/50* (2013.01)

(58) Field of Classification Search
CPC ................. E06C 9/08; E06C 5/16; E06C 7/50
See application file for complete search history.

(56) References Cited

U.S. PATENT DOCUMENTS

| | | | | |
|---|---|---|---|---|
| 4,543,006 A * | 9/1985 | Wang | E06C 1/32 | |
| | | | 16/334 | |
| 6,652,205 B2 * | 11/2003 | Christensen | B61D 45/00 | |
| | | | 410/100 | |
| D635,690 S * | 4/2011 | Casella | B61D 45/00 | |
| | | | D25/64 | |

FOREIGN PATENT DOCUMENTS

EP 3034774 A1 * 6/2016 ............. E06C 1/397

OTHER PUBLICATIONS

EP3034774_translate (Year: 2016).*
https://wetsteps.com/wetsteps/.

* cited by examiner

*Primary Examiner* — Brian D Mattei
*Assistant Examiner* — Jacob G Sweeney
(74) *Attorney, Agent, or Firm* — Mallory M. Henninger; Advent, LLP

(57) ABSTRACT

A swimming ladder system can include a ladder configured to be mounted to a support surface, and a pivot connected to the ladder for anchoring the ladder to the support surface. The pivot can include at least one detent for arresting movement of the ladder at a lowered or operative orientation, a raised or stowed orientation, an intermediate orientation between the lowered or operative orientation and the raised or stowed orientation, and so forth. In some embodiments, the swimming ladder system includes a ratchet lock with a latch, where the latch can be moved between a first orientation for arresting movement of the ladder in a first direction and a second orientation for arresting movement of the ladder in a second direction.

9 Claims, 10 Drawing Sheets

DOCK SWIMMING LADDER

CROSS-REFERENCE TO RELATED APPLICATIONS

The present application claims the benefit under 35 U.S.C. § 119(e) of U.S. Provisional Application Ser. No. 63/022,969, filed May 11, 2020, and titled "DOCK SWIMMING LADDER," and U.S. Provisional Application Ser. No. 63/109,376, filed Nov. 4, 2020, and titled "DOCK SWIMMING LADDER," which are herein incorporated by reference in their entireties.

BACKGROUND

A ladder generally includes a vertical or inclined set of rungs or steps.

DRAWINGS

The Detailed Description is described with reference to the accompanying figures. The use of the same reference numbers in different instances in the description and the figures may indicate similar or identical items.

DETAILED DESCRIPTION

Figure 1:
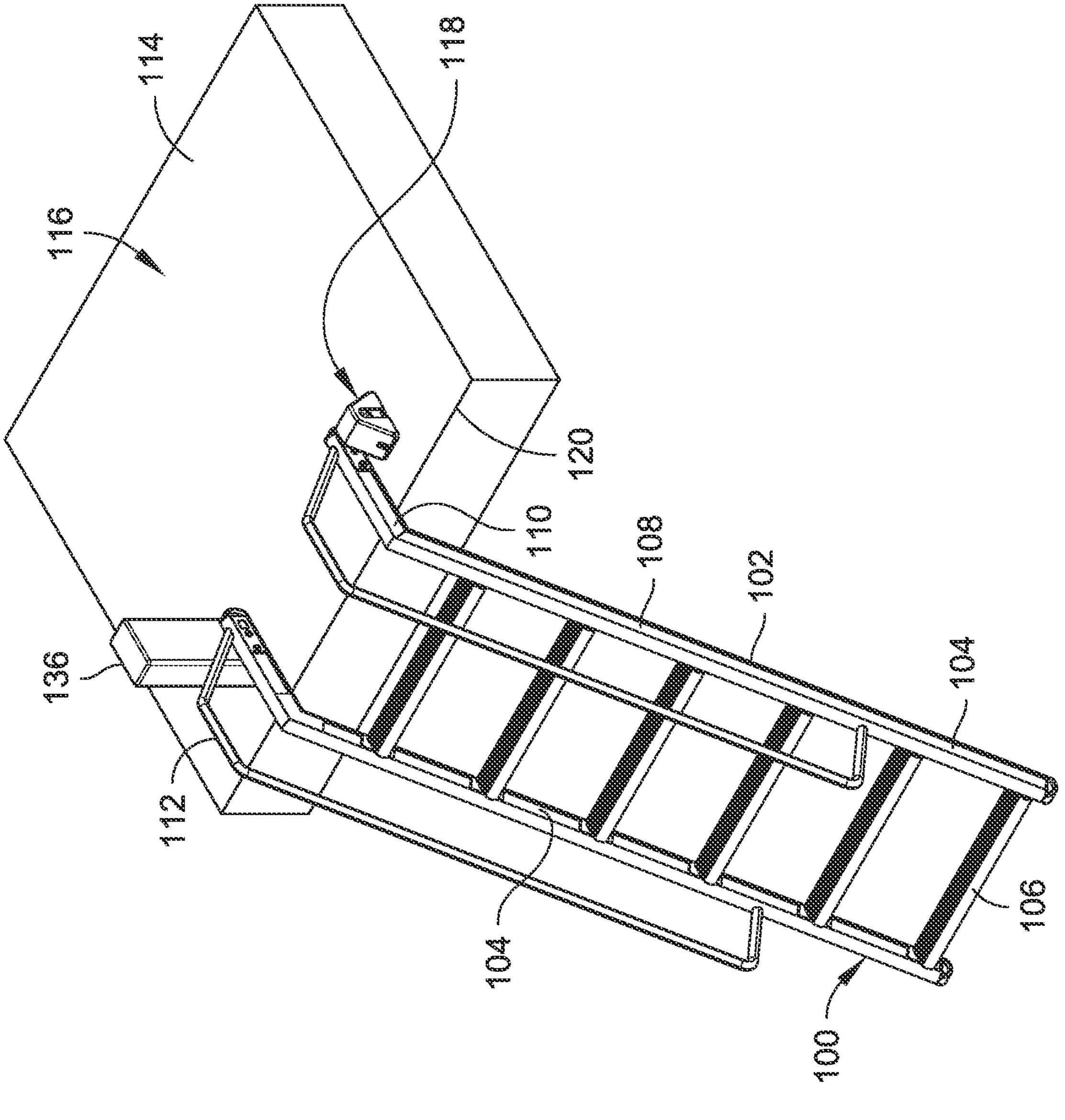
FIG. 1 is a perspective view illustrating a swimming ladder system in accordance with example embodiments of the present disclosure, where a ladder of the swimming ladder system is shown in an operative orientation.
Figure 2:
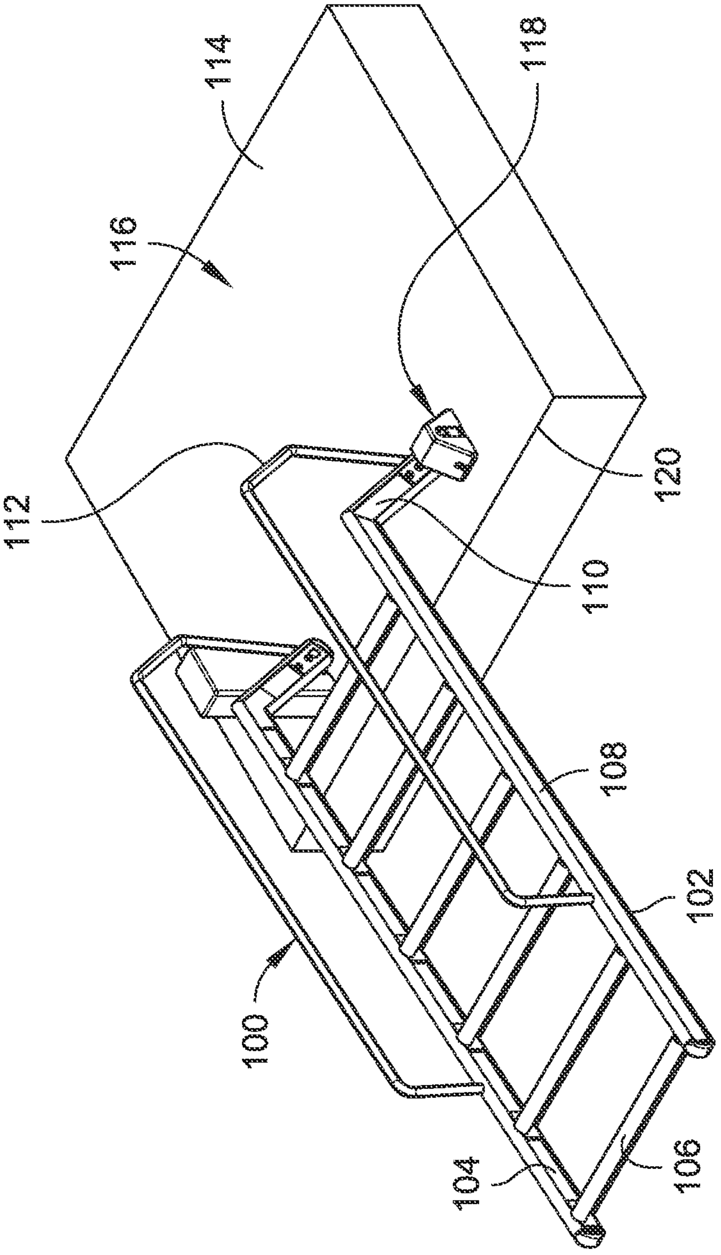
FIG. 2 is another perspective view of the swimming ladder system illustrated in FIG. 1, where the ladder is shown in an intermediate orientation.
Figure 3:
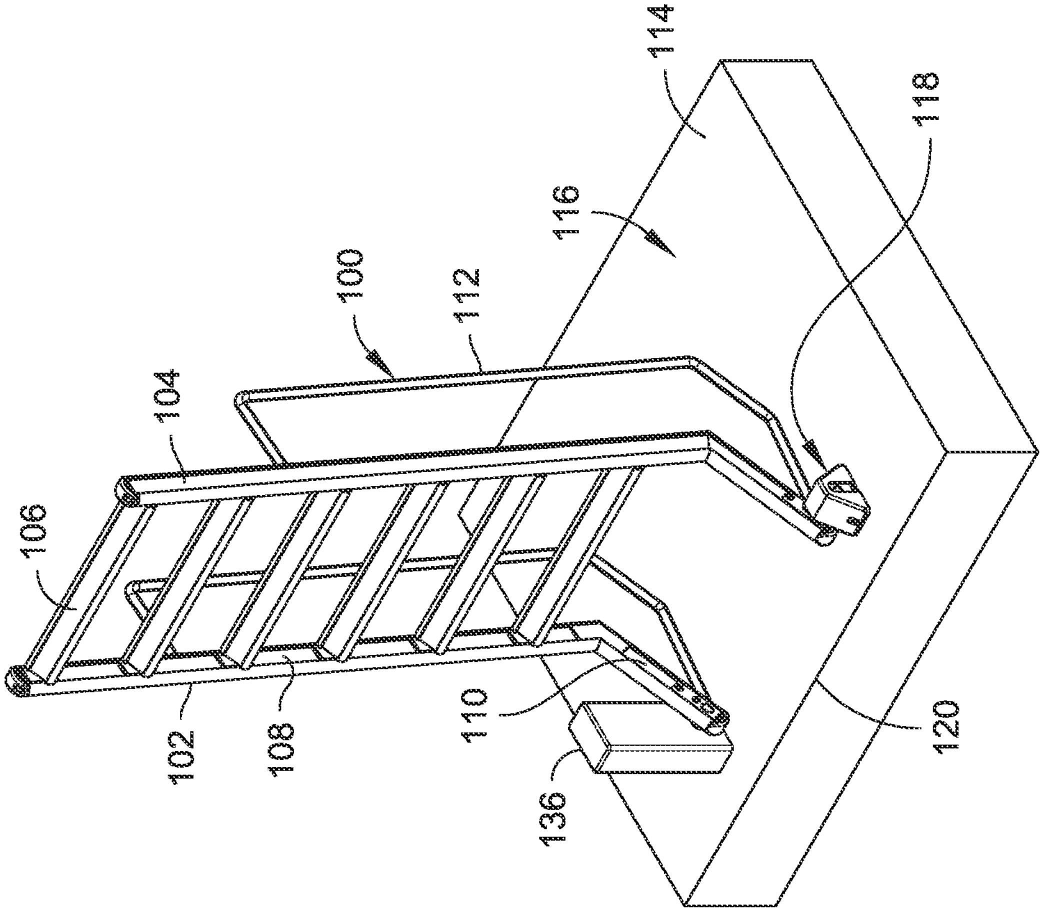
FIG. 3 is a further perspective view of the swimming ladder system illustrated in FIG. 1, where the ladder is shown in a stowed orientation.
Figure 4:
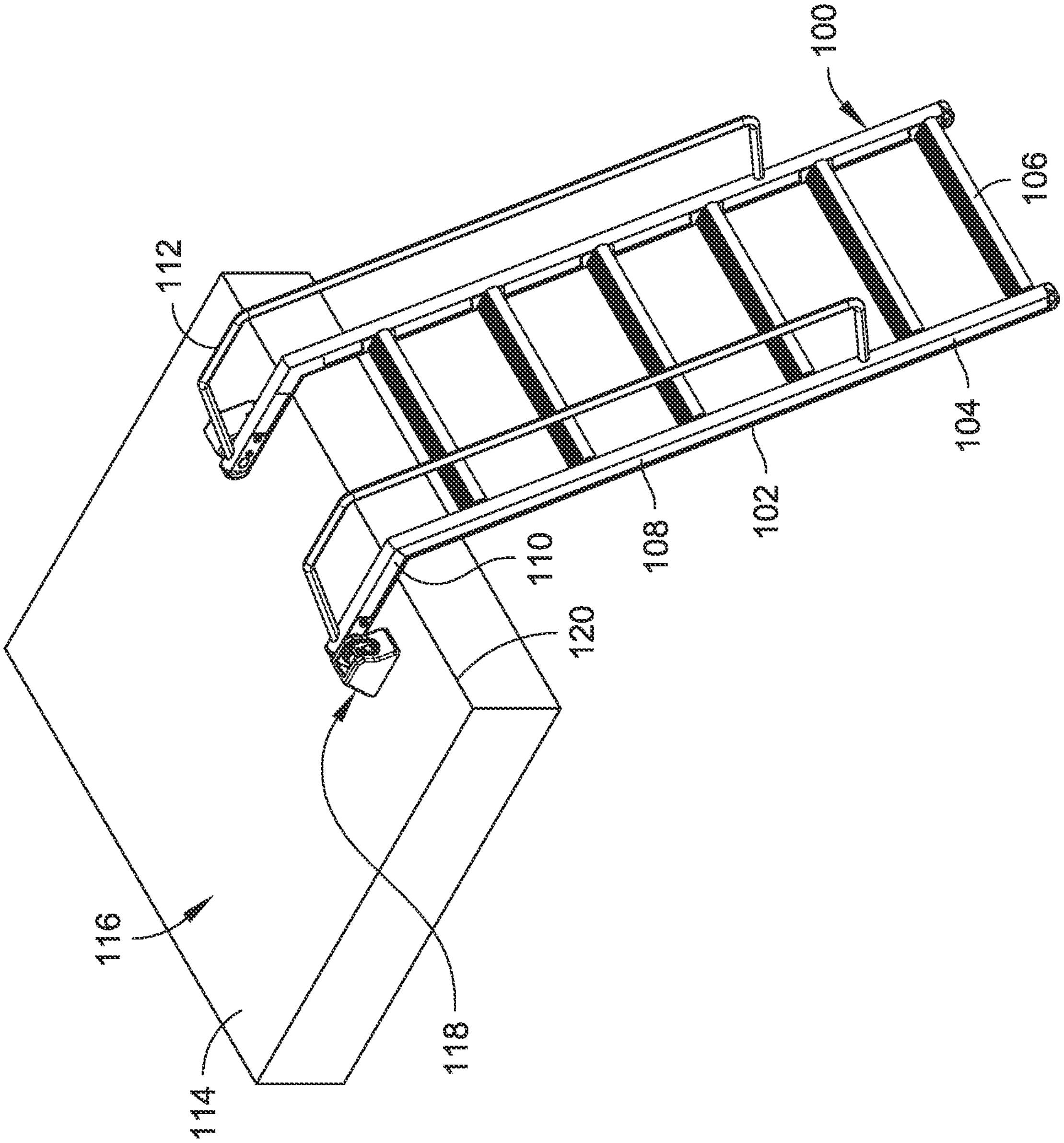
FIG. 4 is a perspective view illustrating another swimming ladder system in accordance with example embodiments of the present disclosure.
Figure 5:
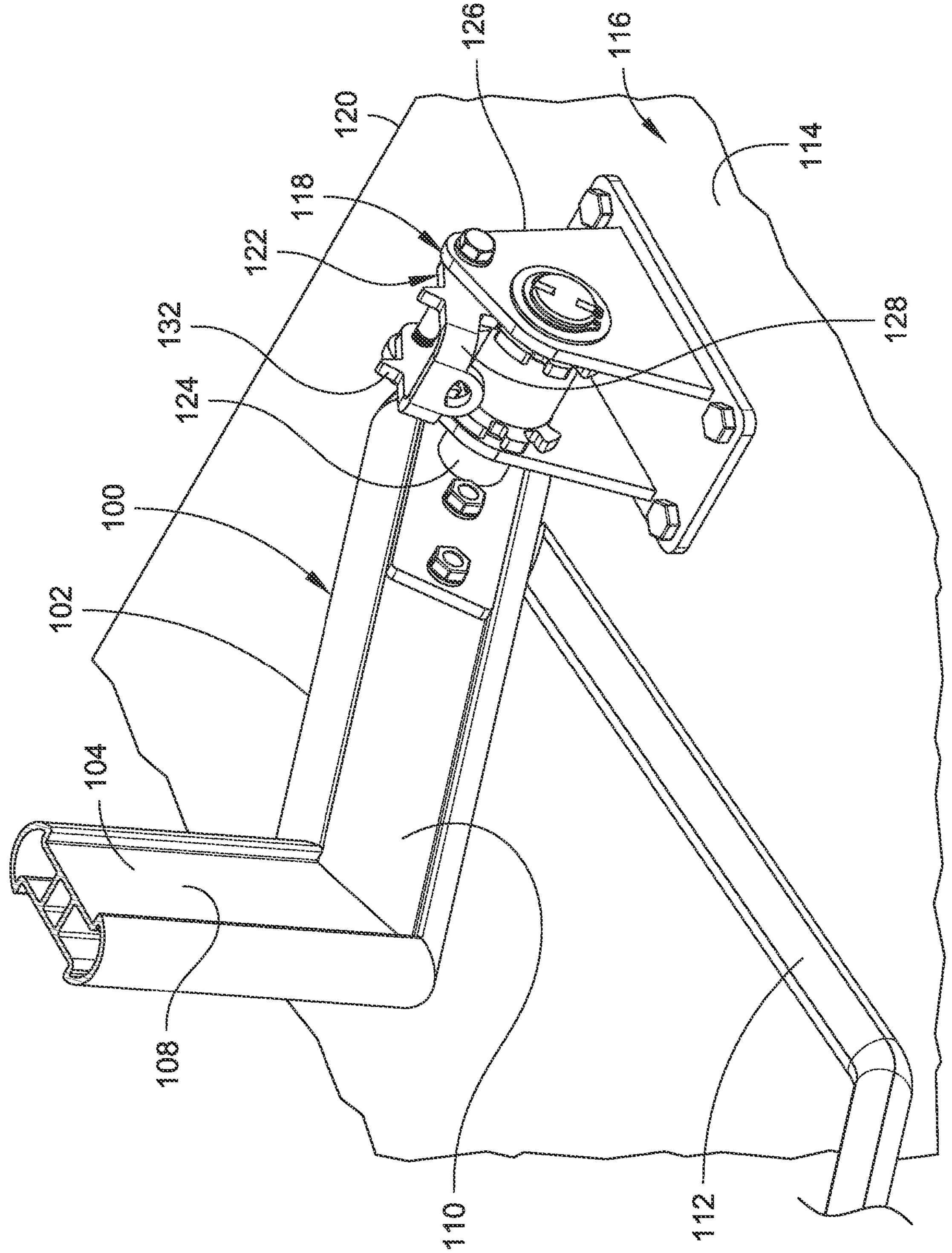
FIG. 5 is a partial perspective view of the swimming ladder system illustrated in FIG. 4.
Figure 6:
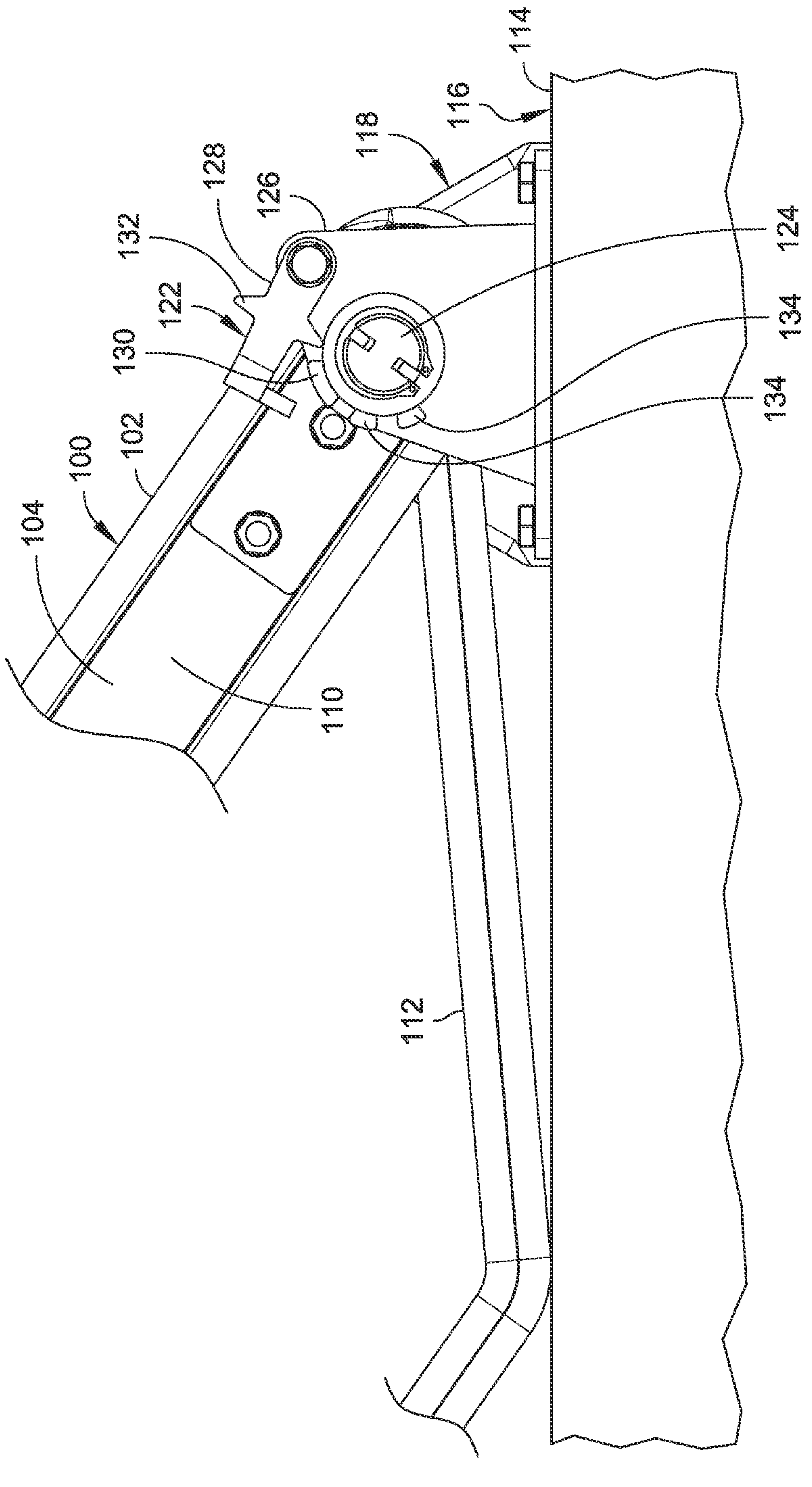
FIG. 6 is a partial cross-sectional side elevation view illustrating a swimming ladder system, such as the swimming ladder system of FIG. 4, in accordance with example embodiments of the present disclosure.
Figure 7:
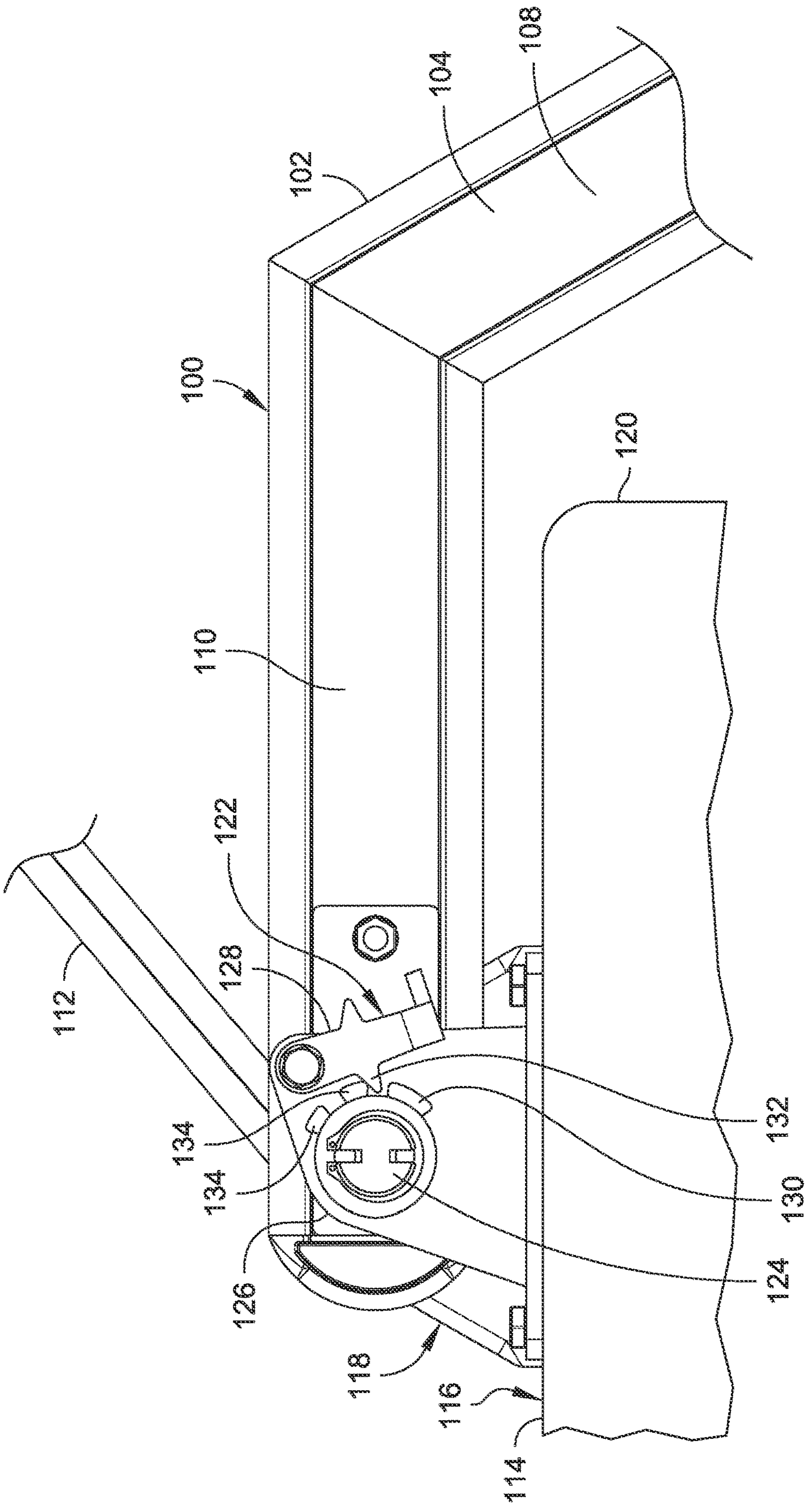
FIG. 7 is another partial cross-sectional side elevation view of the swimming ladder system illustrated in FIG. 6.
Figure 8:
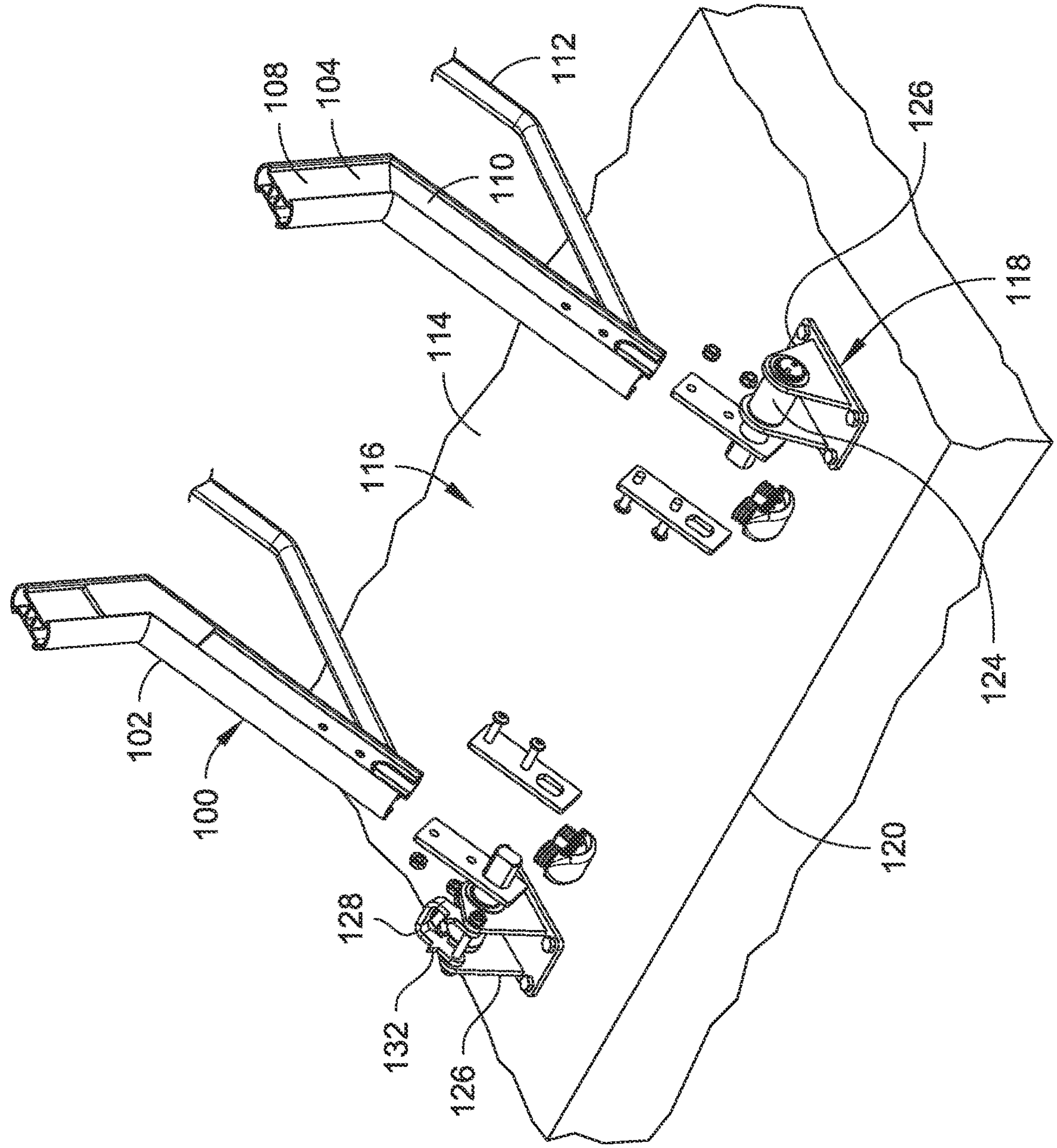
FIG. 8 is a partial exploded perspective view illustrating a swimming ladder system, such as the swimming ladder system of FIG. 4, in accordance with example embodiments of the present disclosure.

Referring generally to FIGS. 1 through 9, swimming ladder systems 100 are described. A swimming ladder system 100 includes a ladder 102 configured to be mounted to a support surface (e.g., a dock or a pontoon), and a pivot connected to the ladder for anchoring the ladder to the dock or to the pontoon. In some embodiments, the ladder 102 can be a fixed ladder 102 including two side members 104 joined by multiple steps or rungs 106. The rungs 106 can include pliable elastomeric (e.g., rubber/rubberized) cushion treads. The side members 104 can each include a first longitudinally extending support 108 spanning the length or height of the ladder 102, and a second angled support 110 extending from the longitudinally extending support 108.

The ladder 102 is configured to be oriented in several positions, including a lowered or operative orientation (e.g., as described with reference to FIG. 1), where the angled supports 110 are positioned generally parallel with respect to a support surface, such as decking of a dock. The ladder 102 can also be positioned in a raised or stowed orientation (FIG. 3), and/or an intermediate orientation (e.g., between the operative orientation and the stowed orientation, as described with reference to FIG. 2). The ladder 102 can also include one or more handles or rails (e.g., hand rails 112) fixedly attached to one of more of the two side members 104. In some embodiments, a hand rail 112 can be connected to the end of the ladder arm, extending up and over an angled support 110.

In some embodiments, the ladder 102 is configured to connect to a support surface 114 that includes, for instance, decking of a dock 116. The decking of the dock 116 can be wood, plastic, metal, and so forth for supporting an operator or user over water. The decking can be permanent decking, including, but not necessarily limited to: wooden decking, plastic lumber (PL) (e.g., polyethylene (PE) extruded and/or molded material), wood-plastic composite lumber, and so forth. The swimming ladder system 100 is configured to attach to the support surface 114 (e.g., using fasteners such as bolts, screws, etc.). The angled supports 110 allow the ladder to be positioned so that the longitudinally extending supports 108 are offset from the edge of the support surface 114 or decking.

In embodiments of the disclosure, the ladder 102 is connected to the support surface 114 or dock 116 at pivots 118, which anchor the ladder 102 to the dock 116. Because of the offset of the longitudinally extending supports 108 from the edge of the dock 116 as provided by the angled supports 110, the pivots 118 can be offset some distance inwardly from an edge 120 of the dock 116. In this manner, the ladder 102 can be oriented in a generally raised, upright, vertical, or stowed orientation with the bulk of the ladder 102 positioned above the dock 116 (e.g., not substantially extending over the edge 120 of the dock 116 when stowed).

Additionally, the angled supports 110 allow the ladder 102 to be offset from the edge 120 of the dock 116 so that a top step or rung 106 of the ladder 102 can be positioned some distance away from the edge 120 of the dock 116 when the ladder 102 is in the operative orientation. The angles of the angled supports 110 with respect to the longitudinally extending supports 108 may also allow the longitudinally extending supports 108 of the ladder 102 to be angled from the vertical when the ladder 102 is in the operative orientation (e.g., when the angled supports 110 are positioned generally parallel with the support surface 114 or decking). This arrangement may facilitate easier climbing, and/or easier entry to and egress from water below the support surface 114.

In embodiments of the disclosure, a pivot 118 can include detents and/or locking mechanisms for arresting movement of the ladder 102 at the lowered or operative orientation and/or at the raised or stowed orientation. As described, the swimming ladder system 100 can include a manually operated ratchet lock 122 located proximate to an axis of rotation of the ladder 102 with respect to a pivot 118. For example, one or more of the side members 104 of the ladder 102 can be fixedly connected to a bar 124 that is rotationally coupled with a pivot 118 in the form of a bracket 126. The bar 124 can support the ladder 102 when connected to the pivot 118, which itself is connected to the support surface 114.

The bar 124 may have one or more fixedly attached teeth that engage with a latch 128 to allow motion of the ladder 102 in only one direction when the latch 128 is engaged with the teeth. For instance, the bar 124 may have a first tooth 130 configured to be engaged by the latch 128 to prevent downward movement of the ladder 102 from the raised or stowed orientation (e.g., as described with reference to FIG. 6) and also configured to be engaged by the latch 128 to prevent upward movement of the ladder 102 from the lowered or operative orientation (e.g., as described with reference to FIG. 7). In embodiments, the latch 128 also includes one or more pawls, cogs, or teeth 132 that allows motion in only one direction when engaged with the tooth or teeth of the bar 124. Thus, the ratchet lock 122 can prevent the ladder 102 from falling when accidentally pushed or bumped by a user (or by the wind) and can also prevent the ladder 102 from being raised by waves when in the water.

In some embodiments, the latch 128 can be pivotally coupled with the bracket 126 and can be rotated between one locking position for retaining the ladder 102 in the raised orientation and another locking position for retaining the ladder 102 in the lowered orientation. For example, an operator flips the latch 128 allowing the ladder 102 to be raised by grabbing the hand rails 112. Once in the raised or stowed orientation, the ratchet lock 122 will automatically latch and hold the ladder 102 in this position. Then, to lower the ladder 102, the operator flips the latch 128 and lowers the ladder 102 into the water. The latch 128 will automatically engage preventing the ladder 102 from being raised and lowered by the waves, which may otherwise cause damage to the ladder 102 and/or the dock 116.

In embodiments, one or more of the pivots 118 includes a detent for arresting movement of the ladder 102 at an intermediate orientation between the lowered or operative orientation and the raised or stowed orientation. For example, the bar 124 may have one or more additional teeth 134 configured to be engaged by the latch 128 to hold the ladder in the intermediate orientation. As previously described, a pawl, cog, or tooth 132 of the latch 128 allows motion in only one direction when engaged with the tooth or teeth 134 of the bar 124. For instance, once the operator has flipped the latch 128 allowing the ladder 102 to be raised by grabbing the hand rails 112, the ladder 102 can be lifted out of the water, and, at a ninety degree or horizontal orientation, the ladder 102 can be released to get a better hold on the hand rails 112 (e.g., without dropping the ladder 102 into the water). The detent provided by the interface between the tooth 134 of the bar 124 and the tooth 132 of the latch 128 allows the ladder 102 to be held in this intermediate position.

Similarly, once the operator has flipped the latch 128 to lower the ladder 102 into the water from the raised or stowed orientation, at a ninety degree or horizontal position the ladder 102 may have a similar detent action to prevent the ladder 102 from being raised (e.g., by waves). It should be noted that this arrangement does not require the use of pivot pins that would otherwise require removal and then reinsertion. Rather, the action of the latch 128 provides an efficient interface for maneuvering the ladder 102 and controlling its motion, while the detent action can provide an intermediate resting position for the ladder 102 while the operator rebalances and/or repositions on the dock 116 (e.g., to improve leverage angles, change grip position on the ladder, etc.).

In some embodiments, a swimming ladder system 100 can include a power assist mechanism 140, such as a piston 142, a spring 144, or another power assist mechanism to assist in raising and/or lowering the ladder (e.g., in addition to and/or in place of a power motor). In some embodiments, the swimming ladder system may not necessarily include either a motor or a power assist mechanism, e.g., being manually operated. In some embodiments, the ladder 102 can be raised and/or lowered using a motorized system. For example, in a motorized arrangement, a motor 146 may be coupled with a ladder 102 using a gearbox 148, which may have a drive ratio selected for minimizing or eliminating a “springboard effect” when resistance from moving the ladder 102 through water under the pontoon or dock is eliminated once the ladder 102 exits the water. Gearing in the motor 146 and/or gearbox 148 can also be configured to minimize or prevent movement of the ladder 102 in the raised and/or lowered position when power is not supplied to the motor. The motor 146 and/or gearbox 148 can be positioned in a housing 136.

In some embodiments, the motor can be coupled with a remote control mechanism (e.g., a wireless remote control 150) and/or another type of input device, such as a manually operated switch and/or keypad on the housing 136 for initiating raising and lowering of the ladder 102. In some embodiments, raising and lowering the ladder 102 can be a one-touch operation. For instance, an operator can press a button or key on a remote control or another input device, and a controller 152 can power the motor 146 to raise or lower the ladder 102 automatically. Further, in some embodiments, the controller 152 can be configured to measure the amperage load on the motor using a sensor 154 or another measuring device. The controller 152 can compare the load to a predetermined amperage value, such as a predetermined amperage threshold. When the amperage load on the motor 146 (e.g., as a result of motor torque) exceeds the predetermined amperage threshold, the controller 152 can cease powering the motor 146, stopping the attempted movement of the ladder 102 at an intended final position (e.g., lowered and/or raised and/or intermediate). In some embodiments, operation of the swimming ladder system 100 can be facilitated through one or more additional systems. For example, the remote control mechanism can be provided with a boat cover system, and the remote can also be used to control operation of the swimming ladder system 100 (e.g., to raise or lower the ladder 102 in a one-touch operation as previously described).

Figure 9:
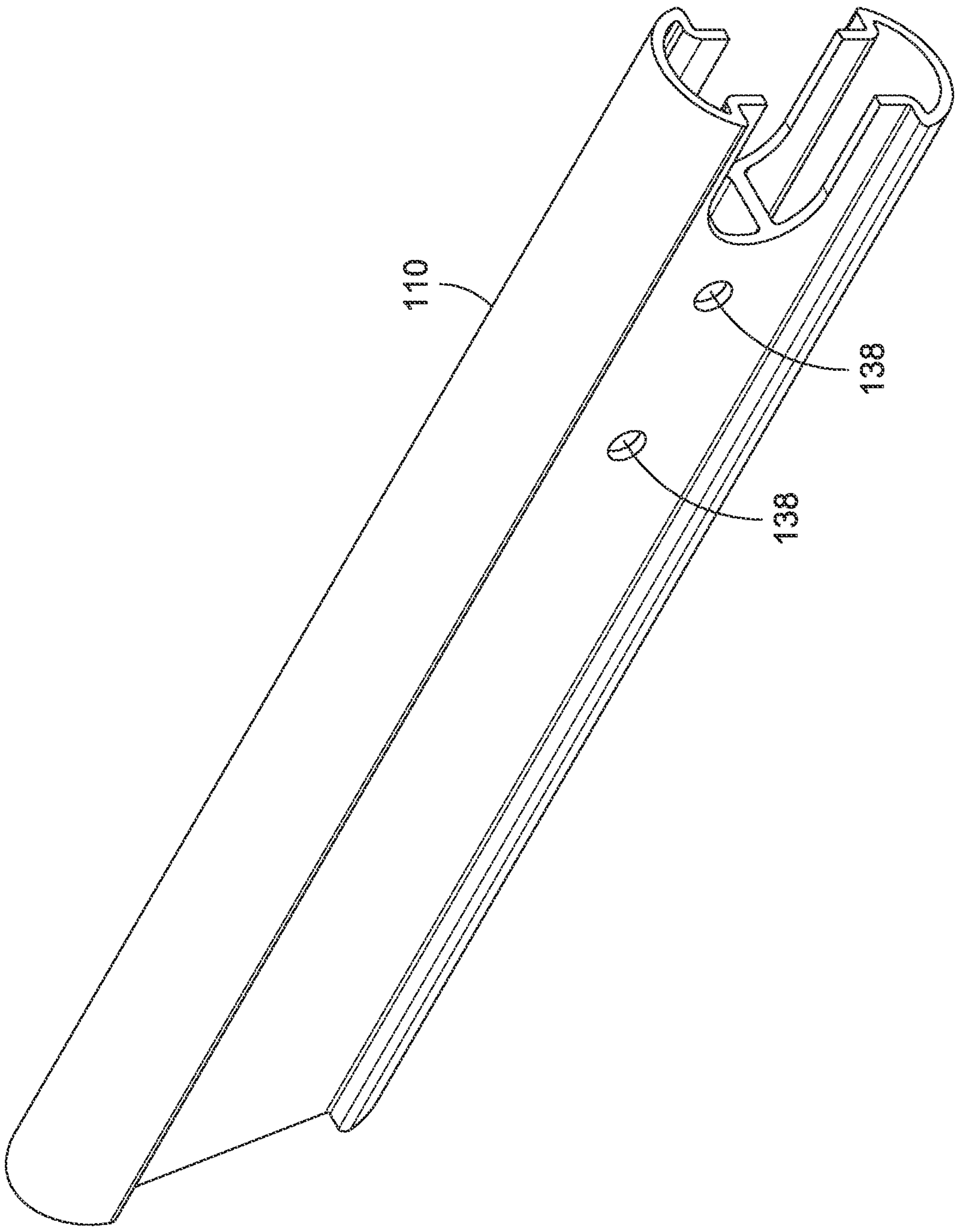
FIG. 9 is a partial perspective view illustrating an angled support for a swimming ladder system, such as the swimming ladder system of FIG. 4, in accordance with example embodiments of the present disclosure.
Figure 10:
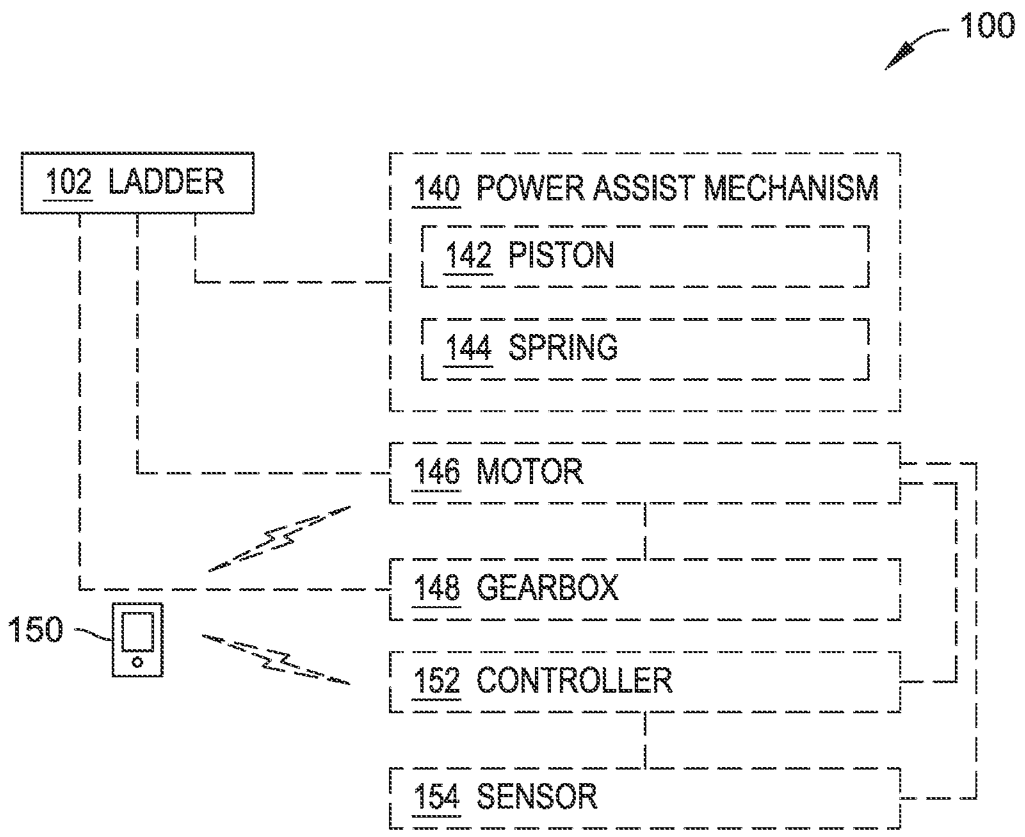
FIG. 10 is a diagrammatic illustration of a swimming ladder system in accordance with example embodiments of the present disclosure.

With reference to FIG. 9, in some embodiments the ladder 102 can be easily removable from the pivots 118 or brackets 126, e.g., for storage when not in use. For example, the angled supports 110 can each include apertures 138 for receiving fasteners, such as bolts, for securing the ladder 102 to the brackets 126. In some embodiments, each angled support 110 can include two apertures 138, and the ladder 102 can be removed from the brackets 126 by removing four bolts. In this manner, the pivots 118 or brackets 126 can be retained on the dock 116 so that they do not require removal and/or realignment once the swimming ladder system 100 has been installed.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A swimming ladder system comprising:

a ladder configured to be mounted to a support surface, the ladder including a first side member having a first longitudinally extending support and a first angled support extending from the first longitudinal support, a second side member having a second longitudinally extending support and a second angled support extending from the second longitudinal support, a plurality of rungs joining the first side member to the second side member and extending between the first longitudinally extending support and the second longitudinally extending support, a first hand rail fixedly attached to the first side member, and a second hand rail fixedly attached to the second side member; and a pivot connected to at least one of the first side member or the second side member for anchoring the ladder to the support surface, the pivot including a bracket, a bar rotationally coupling the ladder to the bracket, the bar including at least two teeth, at least a first detent for arresting movement of the ladder at an intermediate orientation between a lowered or operative orientation and a raised or stowed orientation, the first detent defined by the at least two teeth of the bar, at least a second detent for arresting movement of the ladder at the raised or stowed orientation, the second detent defined by only one tooth of the bar, and a ratchet lock including a latch, the latch movable between a first orientation for arresting movement of the ladder in a first direction and a second orientation for arresting movement of the ladder in a second direction by engaging with the at least two teeth of the bar, wherein all of the teeth of the bar are on one side of the bar as defined by a diameter through the bar.

2. The swimming ladder system as recited in claim 1, wherein the first hand rail extends over the first angled support, and the second hand rail extends over the second angled support.

3. The swimming ladder system as recited in claim 1, wherein the pivot includes at least a third detent for arresting movement of the ladder at the lowered or operative orientation, the third detent defined by the at least two teeth of the bar.

4. The swimming ladder system as recited in claim 1, wherein the first angled support and the second angled support are angled from the first longitudinally extending support and the second longitudinally extending support so that the first longitudinally extending support and the second longitudinally extending support are angled from a vertical direction when the ladder is mounted to a horizontal support surface and positioned in the lowered or operative orientation.

5. A swimming ladder system comprising:

a ladder configured to be mounted to a support surface, the ladder including a first side member having a first longitudinally extending support and a first angled support extending from the first longitudinal support, a second side member having a second longitudinally extending support and a second angled support extending from the second longitudinal support, a plurality of rungs joining the first side member to the second side member and extending between the first longitudinally extending support and the second longitudinally extending support, a first hand rail fixedly attached to the first side member and extending over the first angled support, and a second hand rail fixedly attached to the second side member and extending over the second angled support; and a pivot connected to at least one of the first side member or the second side member for anchoring the ladder to the support surface, the pivot including a bracket, a bar rotationally coupling the ladder to the bracket, the bar including at least two teeth, at least a first detent for arresting movement of the ladder at an intermediate orientation between a lowered or operative orientation and a raised or stowed orientation, the first detent defined by the at least two teeth of the bar, a least a second detent for arresting movement of the ladder at the raised or stowed orientation, the second detent defined by only one tooth of the bar, and a ratchet lock including a latch, the latch movable between a first orientation for arresting movement of the ladder in a first direction and a second orientation for arresting movement of the ladder in a second direction by engaging with the at least two teeth of the bar, wherein all of the teeth of the bar are on one side of the bar as defined by a diameter through the bar.

6. The swimming ladder system as recited in claim 5, wherein the pivot includes at least a third detent for arresting movement of the ladder at the lowered or operative orientation, the third detent defined by the at least two teeth of the bar.

7. The swimming ladder system as recited in claim 5, wherein the first angled support and the second angled support are angled from the first longitudinally extending support and the second longitudinally extending support so that the first longitudinally extending support and the second longitudinally extending support are angled from a vertical direction when the ladder is mounted to a horizontal support surface and positioned in the lowered or operative orientation.

8. A swimming ladder system comprising:

a ladder configured to be mounted to a support surface, the ladder including a first side member having a first longitudinally extending support and a first angled support extending from the first longitudinal support, a second side member having a second longitudinally extending support and a second angled support extending from the second longitudinal support, a plurality of rungs joining the first side member to the second side member and extending between the first longitudinally extending support and the second longitudinally extending support; and a pivot connected to at least one of the first side member or the second side member for anchoring the ladder to the support surface, the pivot including a bracket, a bar rotationally coupling the ladder to the bracket, the bar including at least two teeth, at least a first detent for arresting movement of the ladder at an intermediate orientation between a lowered or operative orientation and a raised or stowed orientation, the first detent defined by the at least two teeth of the bar, a least a second detent for arresting movement of the ladder at the raised or stowed orientation, the second detent defined by only one tooth of the bar, and a ratchet lock including a latch, the latch movable between a first orientation for arresting movement of the ladder in a first direction and a second orientation for arresting movement of the ladder in a second direction by engaging with the at least two teeth of the bar, wherein all of the teeth of the bar are on one side of the bar as defined by a diameter through the bar.

9. The swimming ladder system as recited in claim 8, wherein the pivot includes at least a third detent for arresting movement of the ladder at the lowered or operative orientation, the third detent defined by the at least two teeth of the bar.

* * * * *